United States Patent [19]

Schäper

[11] 4,450,610
[45] May 29, 1984

[54] METHOD OF MAKING A PISTON

[75] Inventor: Siegfried Schäper, Wettstetten, Fed. Rep. of Germany

[73] Assignee: Audi Nsu Auto Union Aktiengesellschaft, Neckarsulm, Fed. Rep. of Germany

[21] Appl. No.: 313,962

[22] Filed: Oct. 22, 1981

[30] Foreign Application Priority Data

Oct. 24, 1980 [DE] Fed. Rep. of Germany ....... 3040125

[51] Int. Cl.³ .................... B23P 15/10; B29C 27/26; B29D 3/02; B65H 81/00
[52] U.S. Cl. .................................. 29/156.5 R; 92/176; 92/212; 92/224; 156/79; 156/173; 156/175; 264/46.5; 264/258
[58] Field of Search .............. 92/176, 212, 224, 190, 92/216, 230, 238, 248, 254; 123/193 P; 29/156.5 R, 412; 264/46.5, 46.6, 46.7, 258; 156/79, 172, 173, 175, 190

[56] References Cited

U.S. PATENT DOCUMENTS

| | | | |
|---|---|---|---|
| 1,398,178 | 11/1921 | Lukacsevics et al. | 92/212 X |
| 1,398,689 | 11/1921 | Hartog | 92/238 X |
| 1,656,293 | 1/1928 | Pribil | 92/224 |
| 1,969,470 | 8/1934 | McCoy | 92/224 |
| 2,478,294 | 8/1949 | Madsen | 92/176 X |
| 3,187,643 | 6/1965 | Pope | 92/212 X |
| 4,306,489 | 12/1981 | Driver et al. | 92/212 |

FOREIGN PATENT DOCUMENTS 2912786  5/1980  Fed. Rep. of Germany .

Primary Examiner—Irwin C. Cohen
Attorney, Agent, or Firm—Karl F. Ross; Herbert Dubno

[57]  ABSTRACT

A piston composed at least in part of fiber-reinforced synthetic resin material, is provided with a piston base or bottom, a piston shaft or shank, and eyes for engagement with a member to be driven by or for driving the piston. According to the method of this invention, the piston bottom and piston shaft are fabricated separately and are form-fittingly interconnected while the eyes are enclosed in a body which is fixed to the piston shaft and abuts at opposite end this shaft and the piston bottom. At least this body and the shaft are formed by a winding of fiber roving impregnated with hardenable synthetic.

8 Claims, 5 Drawing Figures

METHOD OF MAKING A PISTON

FIELD OF THE INVENTION

My present invention relates to pistons which are slidable in cylinders for machines of various types and especially for lifting-piston machines. The invention also relates to a method of making such pistons and especially pistons of fiber-containing or fiber-reinforced synthetic resin materials.

BACKGROUND OF THE INVENTION

Pistons are provided for a wide variety of machines and mechanical devices, the pistons generally being coupled to driving or driven members and being slidable in respective cylinders to develop a pressure differential across the piston or to be displaced in response to a pressure differential thereacross.

Typical of piston machines, is an internal combustion engine in which, during one phase of each cycle, a fuel/air mixture may be compressed within the cylinder by the displacement of the piston via a piston rod or the like.

Because the piston must be subjected to high pressures, it generally has been fabricated as a massive body and this is, of course, an inconvenience because it increases the inertia and mass of the engine. The piston is also subjected to relatively high temperatures and corrosive conditions, high friction forces and high dynamic stresses.

For this reason considerable effort has been expended in developing unique piston shapes and materials to minimize the weight, increase the strength and prevent undue wear or distortion of the piston.

In German patent document (Auslegeschrift) No. 29 12 786, for example, a composite piston has been described, especially for use in internal combustion engines, utilizing at least in part a synthetic resin reinforced by carbon fibers.

This piston is fabricated by coiling technology substantially in one piece and in substantially a single operation with the carbon or other reinforcing fibers oriented in the force-transmission direction around the piston eyes.

This piston has been found to be excellent for the purposes described but has the disadvantage that its fabrication is complex and time-consuming, i.e. cannot be readily transformed into a mass production operation.

Furthermore, for some purposes it is desirable to utilize other materials and it has been found that other materials cannot be readily substituted for the materials described in that document for other loading criteria and operational conditions.

Furthermore, the fabrication cost of such pistons is comparatively high.

OBJECTS OF THE INVENTION

It is the principal object of the present invention to provide an improved method of making a piston which can overcome some of the disadvantages of earlier pistons and which nevertheless is of low cost and capable of providing the advantages of the piston described in the aforementioned publication.

Another object of this invention is to provide a comparatively low-cost method of making a piston which can use mass production techniques.

SUMMARY OF THE INVENTION

These objects and others are attained, in accordance with the present invention, in a fiber-reinforced piston of composite materials, i.e. containing the fiber-reinforced synthetic resin in combination with other materials, which comprises a piston bottom, a piston shank or shaft and means forming piston eyes for coupling the piston to a drive or a driven member. According to this invention, the piston body is fabricated separately from the piston shaft and is form-fittingly connected therewith at least at junctions or transition regions at which these members are in close interfitting contact. Furthermore, the piston is provided with an inner body member which extends around the piston eyes and which has an upper abutment base bonded to or resting against the piston bottom member, preferably along the axis of the piston. The lower base of this body is bonded to the piston shaft, preferably by having a cylindrical portion coaxially surrounded by and closely hugged by a cylindrical portion of the shaft.

According to this invention, at least the inner body and the piston shaft are composed of fiber-reinforced synthetic resin.

Thus, the piston bottom or working end of the piston is formed as a separate structural element from the remainder of the piston, e.g. by die-casting, and can be provided with piston ring grooves or the like, together with any special end contours which may be desired and can be composed of any of a variety of materials depending upon the use to which the piston is to be put. For example, if the piston is to be used for an internal combustion engine, the piston bottom can be composed of a high temperature material such as refractory steel.

The inner body can be composed of a material selected so as to facilitate fabrication while the material of the piston shaft can be selected so that it can contribute to the low friction interaction between the piston flanks and the cylinder. For example, this latter material, may be a self-lubricating synthetic resin material.

The flush form-fitting connection of the piston shaft and the piston bottom prevents separation of the two and the aforedescribed interconnection of the shaft and the inner body and the abutment of this body against the piston bottom, contribute to a rigid structure capable of force-transmission between the member engaging the eye and the working phase of the piston in a unique manner.

According to a feature of the invention, the junction between the piston shaft and the body is formed by the cylindrical or annular base of the body which can have a relatively small wall thickness and from which the body converges upwardly in a dome-like configuration with a progressive increase in wall thickness until the thickest portion is formed at the apex of the dome where this body engages the piston bottom.

In cross section, this piston bottom can be U-shaped so that its cylindrical concavity opens downwardly to allow the upper end of the dome to seat at the bottom of this concavity.

Shaft and shank of the piston can then be fabricated so as to be substantially cylindrical with an upper end surrounding the wall of the cylinder recess of the piston bottom and fitted entirely into an outer step thereof.

In yet another feature of this invention, the piston bottom and the piston shaft and/or the inner body define within the piston a space which can be filled with a porous synthetic resin material, preferably a synthetic resin foam.

It has already been indicated that the piston bottom can be formed from metal while the inner body and the surrounding sleeve forming the piston shaft are composed of fiber-reinforced synthetic resin and preferably in wound filament of carbon, for example, with the winding impregnated and bonded by the synthetic resin. The eyes can be lined with metal sleeves anchored in the synthetic resin of the shaft of the piston.

The piston end can also have a stepped collar which is provided with an annular groove creating the form-fitting engagement with a complementary formation on the piston bottom.

According to yet another feature of the invention, the piston can be formed with grooves each of which can receive a piston ring of conventional design to sealingly cooperate with the wall of the cylinder in which the piston is adapted to reciprocate.

In the other aspect of this invention, the piston is formed by a method which involves providing a core in which a transverse pin secures sleeves or rings adapted to form the eyes on the inner body, whereupon the shaft can be coiled. The body can have previously been coiled on this core.

The core can have, prior to the coiling of the shaft, been provided with the preformed piston end so that the latter is engaged by the windings and especially the initial windings of the shaft.

Thereafter, the synthetic resin material can be hardened and the piston machined to remove excess synthetic resin and to provide the final dimensions.

Prior to machining and hardening, the soft body formed by the coiling of the resin-impregnated carbon filament or roving can be subjected to pressing.

It has been found to be advantageous to form two pistons simultaneously, in which case two piston cores are joined in mirror-symmetrical relationship and are coiled together, the hardened synthetic resin masses being severed by a saw or the like to separate the two pistons.

When two pistons are formed on a single core, the transverse pins can be angularly offset from one another so that the wrapping of the roving or filament can be affected substantially in a figure 8 pattern from one pin to the other.

When a foam structure is to be incorporated into the piston, after winding to form the inner body, foam elements are applied and the resulting core structure is then wrapped by additional resin-impregnated roving or filament. It is also possible to utilize a forming mold to form the secondary core to which the shaft windings are applied, the foam body being formed in situ by injection of a foamable synthetic resin or by foaming synthetic resin within this mold subsequently.

The composite piston has significant advantages over the art in that it allows the wall thicknesses of the various parts to be relatively small without loss in strength and thus high-strength light-weight pistons can be fabricated.

The filling of the interior cavities of the hollow piston with foamed synthetic resin prevents penetration of lubricating oil into these spaces and also facilitates fabrication of the piston in the manner described.

Especially light-weight, high strength, low-wear pistons can utilize aluminum piston bottoms and bearing metal sleeves in the eyes.

It should be noted that the fabrication system of the invention utilizes a prefabricated piston bottom while the inner body and the outer shaft are formed by winding processes. Nevertheless the piston bottom can be composed of fiber reinforced synthetic resin material. The second winding step allows the form-fitting engagement of the piston bottom with the shaft to be made by coiling the resin-impregnated fiber within the step of the piston bottom and thus ensures especially effective sealing between the shaft and the piston bottom and an effective mechanical connection therebetween as well.

The offsetting of the pins through, say, 90° allows the wrapping roving to be wound at angles of 30° to 70° to the axis and greatly simplify the fabrication of the pistons.

BRIEF DESCRIPTION OF THE DRAWING

The above and other objects and advantages of the present invention will become more readily apparent from the following description, reference being made to the accompanying drawing in which.

SPECIFIC DESCRIPTION

Figure 2:
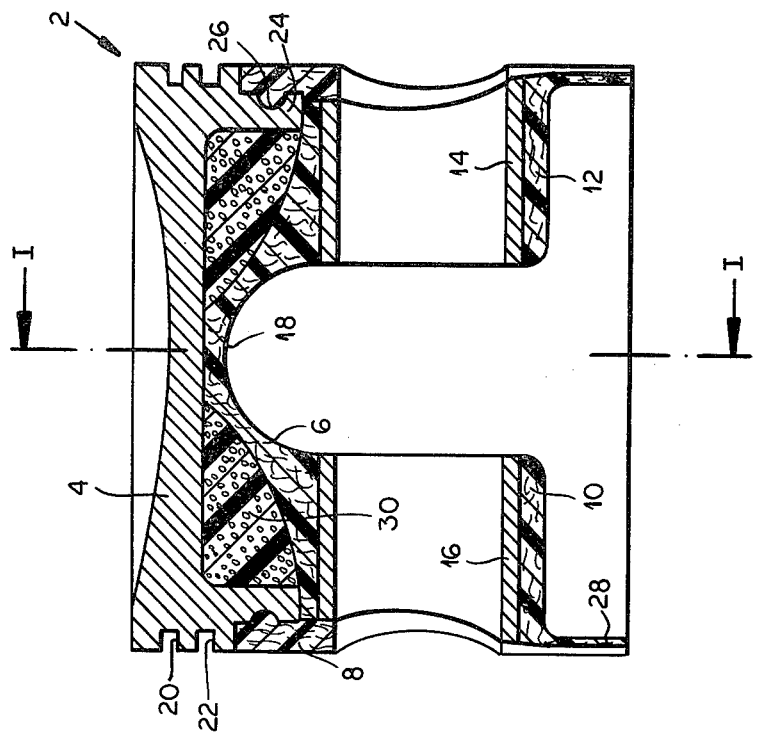
FIG. 2 is a section through the same piston along the line II—II of FIG. 1.
Figure 1:
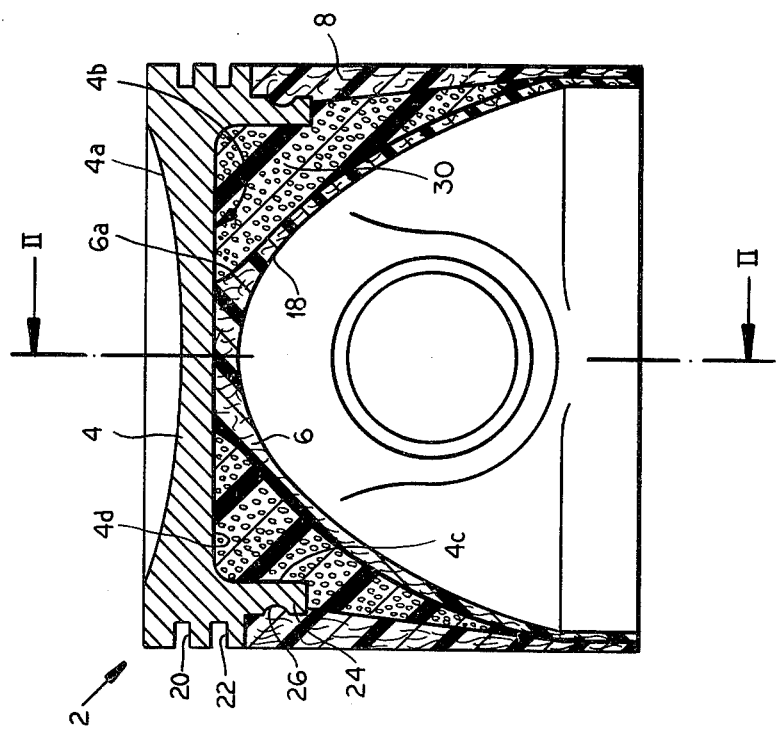
FIG. 1 is an axial cross-sectional view through a piston according to the invention, the section being taken along line I—I of FIG. 2.

FIGS. 1 and 2 show a piston for internal combustion engines and comprising a metal piston bottom 4, constituting a piston head and having a concave face 4a adapted to be turned toward the cylinder chamber in which the fuel/air mixture is to be compressed. The piston has been found to be especially effective for two-cycle and light-weight, low-compression engines. The piston bottom 4 is composed of aluminum and has a U-cross section to form a concavity 4b with a cylindrical wall 4c surrounding a planar floor 4d.

Within this recess, an oval boss 6a at the apex of a dome formation 18 of the inner body 6 bears upon or is bonded to the aluminum or other light-metal piston bottom 4.

The other two elements of the piston, apart from journaling sleeve 16 which can also be of light metal, are the sleeve or shaft 8 of fiber-reinforced synthetic resin and the filling body 30 of polyurethane.

The inner body 6, which is preferably composed of carbon fiber-reinforced epoxy resin, surrounds the eyes 10 and 12 in which the bearing sleeves 14 and 16 are inserted, the inner body converging in domed fashion toward the piston bottom 4 from a wide cylindrical base 28.

In addition to the piston ring grooves 20 and 22 which are formed in situ in the aluminum bottom 4 of the piston when the latter is cast, a step 24 with an outwardly open rounded groove 26 is provided in the piston to accommodate the end of the piston shaft 8.

The step defines a collar which form-fittingly engages the piston shaft which is composed of carbon fiber-reinforced epoxy resin. The carbon fibers run at an angle of 30° to 70° to the generatrices of the periphery. At the lower end, the shaft 8 is of thin-wall construction and has a cylindrical ring 28 which is bonded to a corresponding cylindrical formation of the inner body 6.

The space between the piston bottom 4, the shaft 8 and the body 6 is filled with low density polyurethane foam, preferably expanded within this space to form the filling body 30.

The pistons of the present invention can be formed by providing two cores 32, 34 of similar configuration and whose outer contours correspond to the inner contour of the body 6 which is to be wound thereon.

The cores 32 and 34 are provided with transverse pins 36, 38 upon which the metal slips 10 and 12 are mounted to line the eyes of the pistons. The cores 32 and 34 are assembled substantially in mirror-symmetrical arrangement by a bayonet coupling not shown.

A shaft 40 is threaded into the assembly along the separating plane of the two cores so that the cores can be mounted on a coiling machine provided with the usual drive for imparting a complex rotary or angular displacement to the core. The pins 36 and 38 are angularly offset by 90° from one another.

Figure 3:
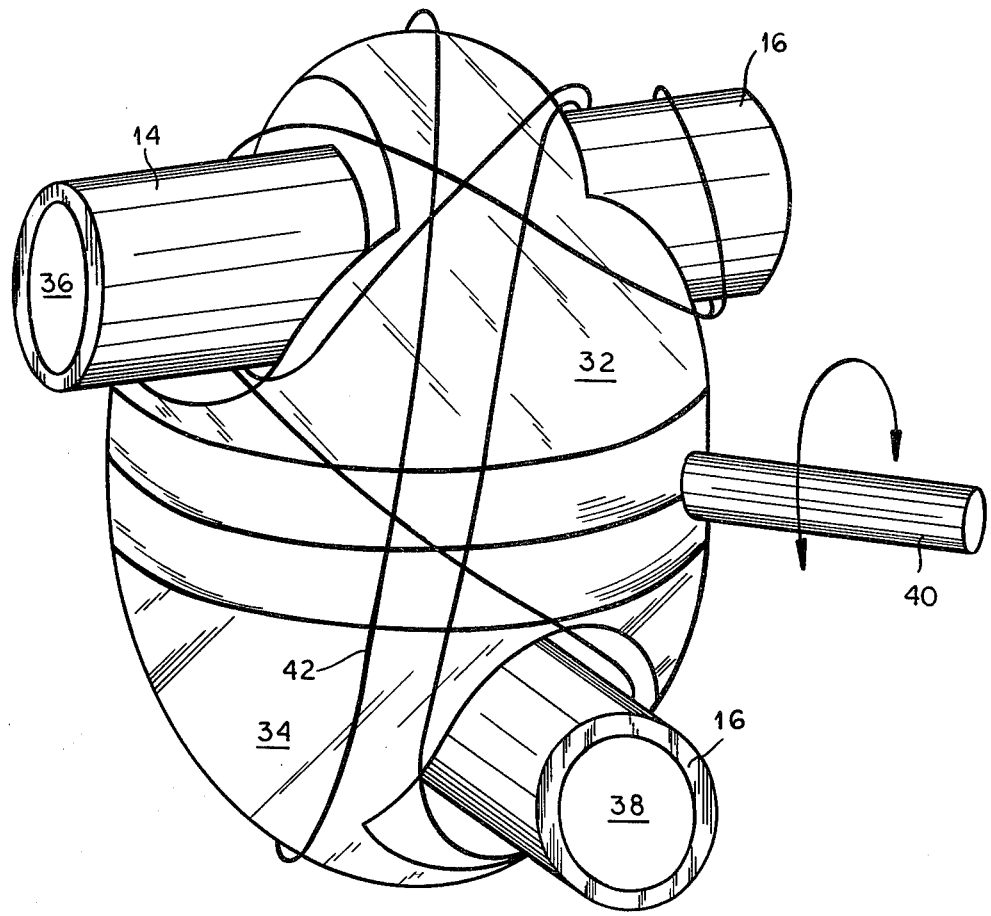
FIG. 3 is a diagrammatic perspective view showing two interconnected cores for fabricating two pistons simultaneously and illustrating the winding pattern for producing the inner bodies.

The metal sleeves 14 and 16 are applied to the pins 36 and the cores are coiled with epoxy-impregnated carbon fiber roving 42 in a figure 8 pattern as shown in FIG. 3. Thus the roving is passed around each pin 36, 38, around the sleeves thereof, transversely across the core to the opposite side and then longitudinally across the cores. Because of this figure 8 configuration among all pairs of sleeves, the roving crosses itself many times, providing high tensile and compressive strength to the body 6.

Figure 4:
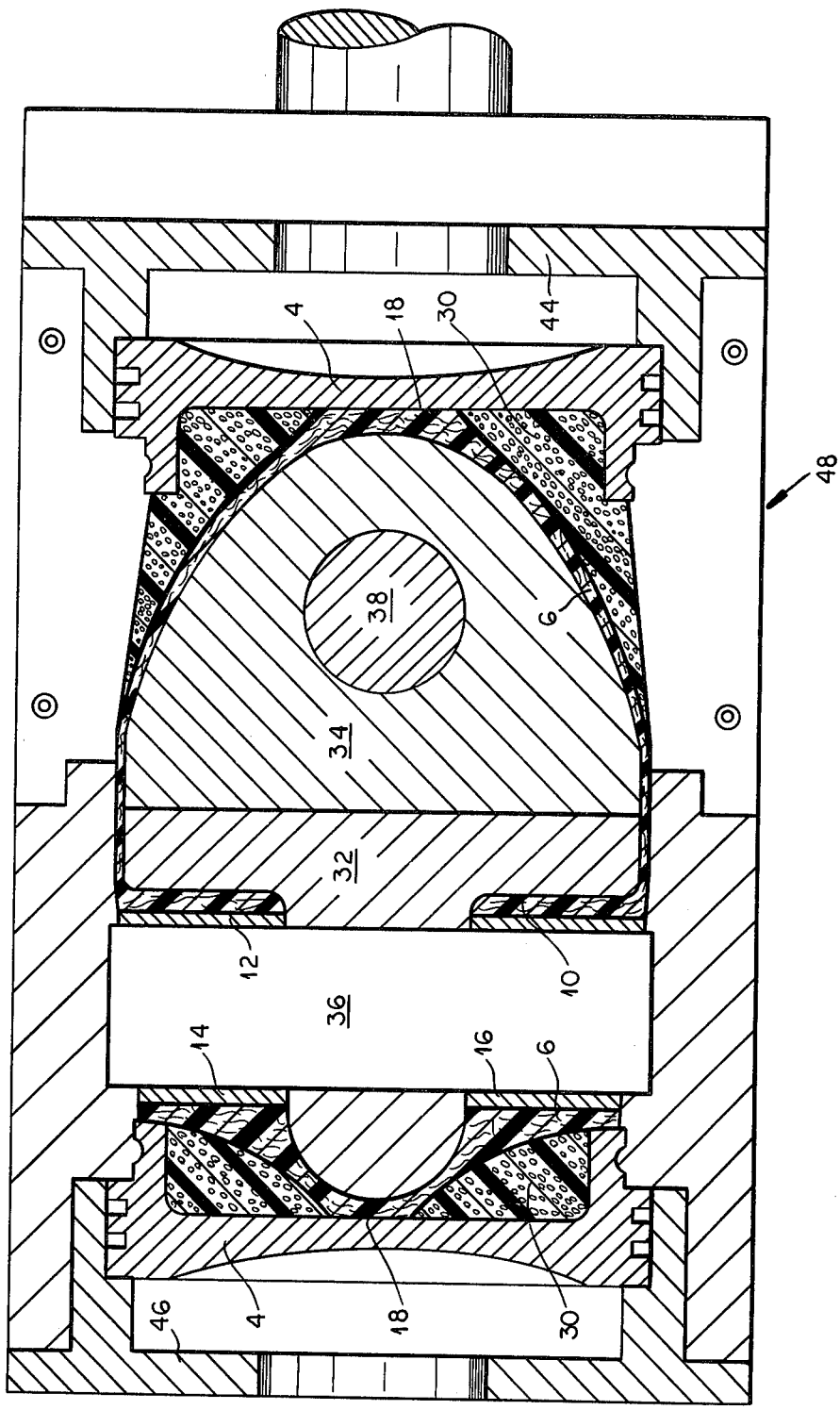
FIG. 4 is a section through the cores after the winding of the inner bodies and showing the application of forms or molds for the foaming of synthetic resin material therein.

After the body 6 has been formed and before complete hardening thereof, the prefabricated piston bottom 4 is pressed onto the boss 6a and is held in place by a clamping flange 46 (see FIG. 4). A corresponding flange is provided on the opposite side at 44 and the flanges 44 and 46 are mounted in multipart foaming mold 48 which spacedly surrounds the body 6 and has an interior configuration corresponding to that of the piston shaft or sleeve 8. The spaces thus created at 30 are then filled with a large-pore polyurethane foam of low density of the closed-pore type through passages in the mold 48 which have not been illustrated.

Figure 5:
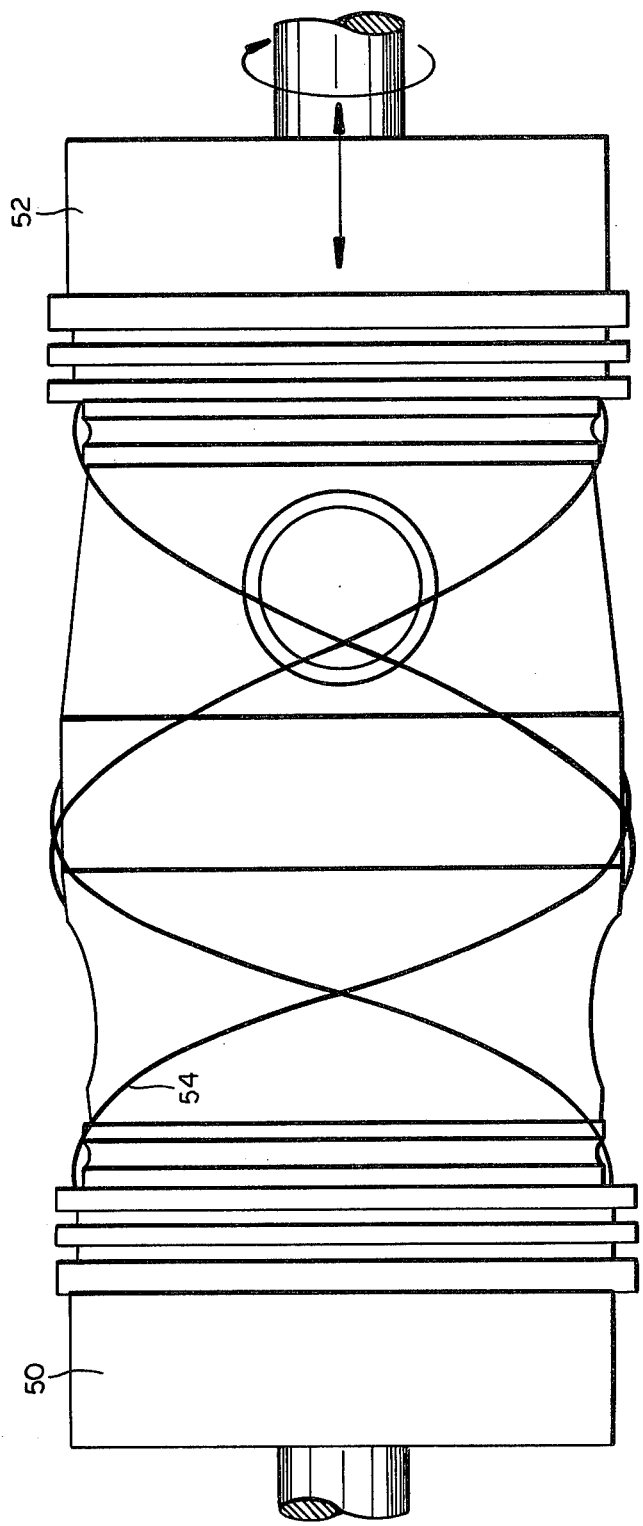
FIG. 5 is an elevational view illustrating the winding of the shaft portions of the two pistons, the illustration being highly diagrammatic in form.

After hardening of the body 6 and the foam, the mold 48 is removed and the sleeve 8 is wound from carbon fiber roving impregnated with epoxy resin as can be seen in FIG. 5, likewise with a figure 8 pattern. The windings here extend over the collar 24 and into the groove 26.

Utilizing another mold, the sleeve 8 is pressed radially to densify the latter and improve its surface characteristics and, after hardening, the synthetic resin junction between the two pistons is divided by a blade inserted along the separating plane, the cores are then separated and the pins 36 and 38 removed to allow withdrawal of each core from the piston.

I claim:

1. A method of making a piston having a piston bottom forming a working end of a piston;
    a piston sleeve formed separately from and form-fittingly connected to said piston bottom and forming a shaft of the piston; and
    a piston body within said sleeve connected to said piston bottom at one end of said body and to said sleeve at an opposite end of said body, said body and said sleeve defining eyes enabling the piston to be connected to a member of a piston machine, both said body and said sleeve being composed of fiber-reinforced synthetic resin, said method comprising the steps of:
    (a) forming a core having an external configuration corresponding to the internal configuration of said body and traversed by a pin around which said eyes can be formed;
    (b) winding said core with a fiber roving impregnated with hardenable synthetic resin to form said body;
    (c) applying said bottom to said body;
    (d) winding a fiber roving impregnated with synthetic resin onto said bottom and around said body to form said sleeve; and
    (e) withdrawing said core from the piston thus formed.

2. The method defined in claim 1, further comprising imparting to said body a domed configuration converging from said opposite end to said one end, forming the bottom of a U-shaped cross section with a concavity opening in the direction of said body, and forming said sleeve with a configuration substantially of a hollow cylinder and defining a space around said body with said bottom.

3. The method defined in claim 2, further comprising filling said space with a low density porous synthetic resin material.

4. The method defined in claim 3, further comprising inserting metal sleeves in said eyes.

5. The method defined in claim 3 further comprising forming said bottom with a collar of reduced diameter having an outwardly open groove, and form-fittingly engaging said sleeve with said collar and said groove.

6. The method defined in claim 1 wherein two similar cores are assembled together and respective pistons are formed thereon with the roving being wound in steps (b) and (d) across both cores in a figure 8 pattern.

7. The method defined in claim 6 wherein the pins of said cores are angularly offset from one another and the roving is looped around a pin on one core and then around a pin on the other core during the winding steps (b) and (d).

8. The method defined in claim 6, further comprising enclosing said cores and the bodies formed thereon in a forming mold following step (c) and applying foamed polyurethane around said bodies, step (d) being carried out by winding the roving of step (d) onto the foamed polyurethane surrounding said bodies.

* * * * *